United States Patent
Mammen et al.

(10) Patent No.: US 10,047,883 B2
(45) Date of Patent: Aug. 14, 2018

(54) SEAL SURFACE CONFIGURATION FOR FLUID SYSTEM COMPONENTS

(71) Applicant: Fiskars Oyj Abp, Helsinki (FI)

(72) Inventors: Chad James Mammen, Washington, IL (US); Robert Richard Brimble, Edwards, IL (US); Lawrence P. Heren, East Peoria, IL (US); Kalyan Vedantam, Peoria, IL (US)

(73) Assignee: Fiskars Oyj Abp, Helsinki (FI)

( * ) Notice: Subject to any disclaimer, the term of this patent is extended or adjusted under 35 U.S.C. 154(b) by 405 days.

(21) Appl. No.: 14/456,796

(22) Filed: Aug. 11, 2014

(65) Prior Publication Data

US 2015/0048615 A1  Feb. 19, 2015

Related U.S. Application Data

(60) Provisional application No. 61/865,006, filed on Aug. 12, 2013.

(51) Int. Cl.
*F16L 19/00* (2006.01)
*F16L 19/02* (2006.01)

(52) U.S. Cl.
CPC ............... *F16L 19/0218* (2013.01)

(58) Field of Classification Search
CPC .............. F16L 19/0218; F16L 21/03
USPC ........ 285/246, 353, 349, 336, 357, 379, 374
See application file for complete search history.

(56) References Cited

U.S. PATENT DOCUMENTS

| | | | | |
|---|---|---|---|---|
| 2,110,825 A | * | 3/1938 | Archer | F16L 15/003 137/902 |
| 2,245,154 A | * | 6/1941 | McWane | F16L 21/03 277/615 |
| 2,417,025 A | * | 3/1947 | Volpin | F16L 37/113 285/336 |
| 2,429,782 A | * | 10/1947 | Versoy | F16L 37/025 285/304 |

(Continued)

FOREIGN PATENT DOCUMENTS

| EP | 0 756 119 A2 | 1/1997 |
|---|---|---|
| JP | 05-240356 A | 9/1993 |

OTHER PUBLICATIONS

International Search Report and Written Opinion, PCT/US2014/050585, Robert Bosch GmbH et al., 9 pages (dated Nov. 20, 2014).

(Continued)

*Primary Examiner* — Aaron M Dunwoody
(74) *Attorney, Agent, or Firm* — Foley & Lardner LLP

(57) ABSTRACT

A seal system includes a first connector member, a second connector member, a gland structure, and a seal member. The first and second connector members include respective seal structures. The second connector member is configured for connection to the first connector member. The gland structure is defined by the first connector member and the second connector member, and is located between the first and the second seal structures. The seal member is at least partially positioned in the gland structure. The first and second seal structures are configured to deform the seal member into the gland structure in response to connection of the first connector member and the second connector member.

20 Claims, 14 Drawing Sheets

(56) References Cited

U.S. PATENT DOCUMENTS

| | | | | |
|---|---|---|---|---|
| 2,458,817 A * | 1/1949 | Wolfram | F16L 19/0283 | 277/622 |
| 2,463,196 A * | 3/1949 | Parker | F16L 19/046 | 285/332.2 |
| 2,677,416 A * | 5/1954 | Smitb | F23D 14/465 | 239/431 |
| 2,735,505 A * | 2/1956 | Kleiman | F16L 21/08 | 137/247.49 |
| 3,083,042 A * | 3/1963 | Collar | F16L 37/101 | 285/314 |
| 3,144,262 A * | 8/1964 | Reynolds | F16L 33/12 | 285/311 |
| 3,746,348 A * | 7/1973 | Stone | F16J 15/061 | 277/609 |
| 3,747,960 A * | 7/1973 | Bawa | H02G 3/06 | 285/332.2 |
| 3,888,496 A * | 6/1975 | Dryer | F16J 15/022 | 277/614 |
| 4,752,089 A * | 6/1988 | Carter | F16L 37/23 | 285/276 |
| 5,251,941 A * | 10/1993 | McGarvey | F16L 19/0218 | 277/609 |
| 5,370,507 A * | 12/1994 | Dunn | F04B 15/04 | 137/533.15 |
| 5,516,122 A * | 5/1996 | Caffee | F16J 15/062 | 277/614 |
| 2006/0151959 A1 | 7/2006 | Meller et al. | | |
| 2008/0048440 A1 | 2/2008 | Anderson et al. | | |
| 2012/0080854 A1 | 4/2012 | Slack et al. | | |

OTHER PUBLICATIONS

International Preliminary Report on Patentability, PCT/US2014/050585, Fiskars Oyj Abp, 8 pages (dated Feb. 25, 2016).

* cited by examiner

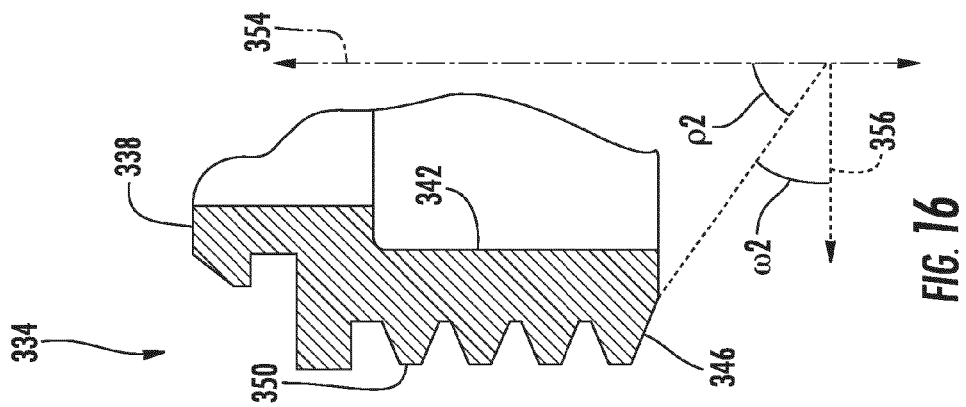
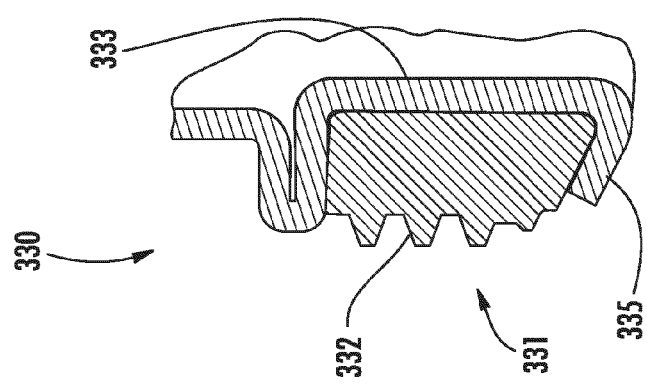
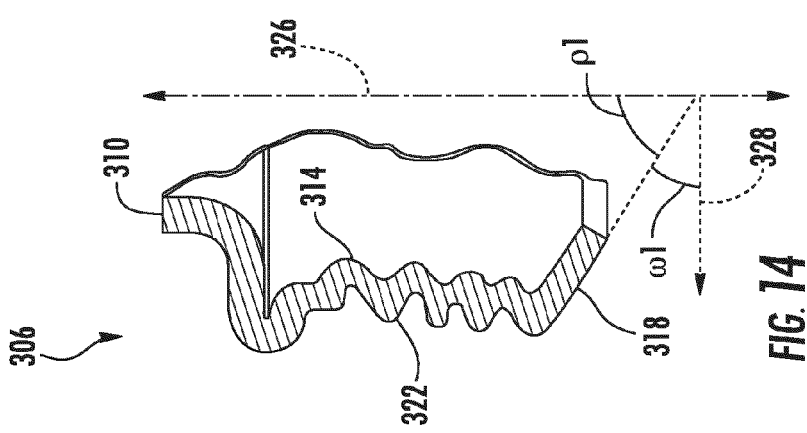

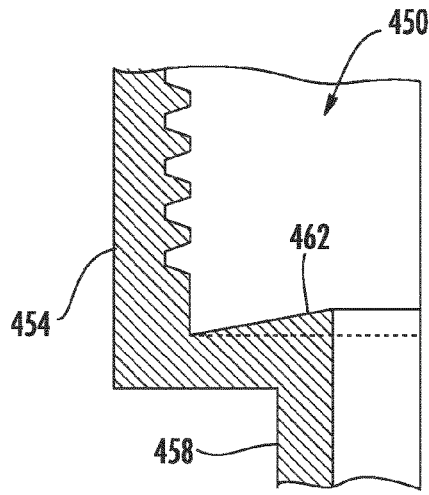
FIG. 20
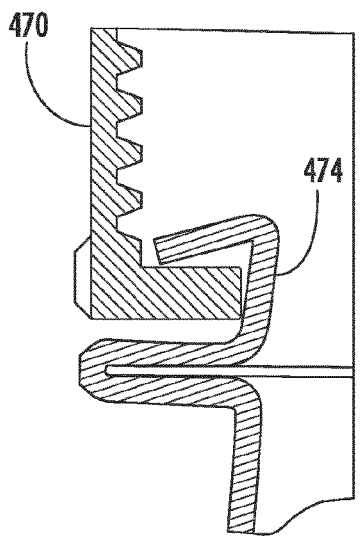
FIG. 21
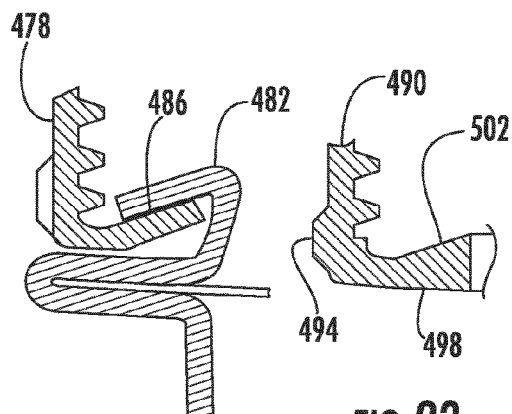
FIG. 22
FIG. 23

SEAL SURFACE CONFIGURATION FOR FLUID SYSTEM COMPONENTS

This application claims the benefit of priority of U.S. provisional application Ser. No. 61/865,006, filed on Aug. 12, 2013, the disclosure of which is herein incorporated by reference in its entirety.

FIELD

This disclosure relates generally to fluid system components and more particularly to fluid system components having an improved seal surface configuration configured to prevent fluid leaks.

BACKGROUND

Fluid systems are utilized in a wide variety of industrial, household, medical, hydraulic, pneumatic, and commercial applications. One exemplary fluid system is a hose and hose end product, such as a spray nozzle, a lawn sprinkler, and the like. Another exemplary fluid system is used in the automotive industry and includes hoses and nozzles for the delivery of fuel and other petroleum-based products. Yet another exemplary fluid system includes vacuum cleaners, power tools, and other devices for collecting debris or dispensing fluid. Fluids, such as beverages, fuels, liquid chemicals, fluidic food products, gases, water, and air are also frequently transferred from one vessel to another through a fluid system.

Fluid systems typically include a first connector and a second connector. In one example, the first connector is associated with a fluid device and the second connector is associated with a fluid conductor. The fluid device is provided as a spray nozzle and the fluid conductor is provided as a hose, for example.

Typically, a seal member is interposed between the first connector and the second connector to prevent fluid leaks and slow drips at the junction of the first connector and the second connector. Sometimes, as a result of wear, poor design, and other factors even though a seal member is present fluid leaks and slow drips still occur.

In response to observing a fluid leak and/or a slow drip at the junction of the first connector and the second connector, users typically attempt to further tighten the connection between the first connector and the second connector. More advanced users may also attempt to replace the seal member with a newer, softer, and/or differently sized seal member. None of these responses, however, typically stops the fluid leak and/or the slow drip.

When the connection between the connectors of a typical fluid system are tightened and/or the seal member is replaced with a different seal member, the seal member is compressed/squeezed between the connectors and is deformed and dislodged from a desired seal member position. In particular, seal surfaces within the connectors dislodge/move the seal member into a fluid channel defined by at least one of the connectors. The deformation and movement of the seal member prevents the seal surfaces from forming a fluid tight junction between the connectors and the leak between the connectors persists to the frustration of the user.

For at least the above-described reasons, further developments in the area of seal surfaces for fluid systems are desirable.

SUMMARY

According to an exemplary embodiment of the disclosure, a seal system includes a first connector member, a second connector member, a gland structure, and a seal member. The first connector member includes a first seal structure. The second connector member is configured for connection to the first connector member and includes a second seal structure. The gland structure is located between the first connector member and the second connector member. The seal member is at least partially positioned in the gland structure. The first seal structure and the second seal structure are configured to deform the seal member therebetween and into the gland structure in response to connection of the first connector member and the second connector member.

According to another exemplary embodiment of the disclosure, a connector system includes a first connector member, a second connector member, and a seal member. The first connector member defines a first channel therethrough and includes a first coupling portion and a first seal structure extending from the first coupling portion. The first channel defines a longitudinal axis. The second connector member defines a second channel therethrough and includes a second coupling portion and a second seal structure extending from the second coupling portion. The second coupling portion is configured to engage the first coupling portion to couple the first channel to the second channel. The seal member is at least partially received by one of the first seal structure and the second seal structure. The first seal structure and the second seal structure are configured to deform the seal member away from the longitudinal axis when the first coupling portion and the second coupling portion are engaged.

According to yet another exemplary embodiment of the disclosure, a method of manipulating a connector system includes engaging a first coupling portion of a first connector member with a second coupling portion of a second connector member. The first connector member defines a first channel therethrough, and the second connector member defines a second channel therethrough. The method further includes positioning a first seal structure extending from the first coupling portion and a second seal structure extending from the second coupling portion against a seal member at least partially received by a gland structure located between the first connector member and the second connector member. The method also includes moving the first seal structure toward the second seal structure to deform the seal member therebetween and into the gland structure to connect the first channel to the second channel.

BRIEF DESCRIPTION OF THE FIGURES

The above-described features and advantages, as well as others, should become more readily apparent to those of ordinary skill in the art by reference to the following detailed description and the accompanying figures in which:

FIG. 14 is a cross sectional view of a portion of another embodiment of a male connector, as described herein;

FIG. 15 is a cross sectional view of a portion of another embodiment of a male connector, as described herein;

FIG. 16 is a cross sectional view of a portion of another embodiment of a male connector, as described herein;

FIG. 20 is a cross sectional view of a portion of another embodiment of a female connector, as described herein;

FIG. 21 is a cross sectional view of a portion of another embodiment of a female connector, as described herein;

FIG. 22 is a cross sectional view of a portion of another embodiment of a female connector, as described herein;

FIG. 23 is a cross sectional view of a portion of another embodiment of a female connector, as described herein;

DETAILED DESCRIPTION

Figure 1:
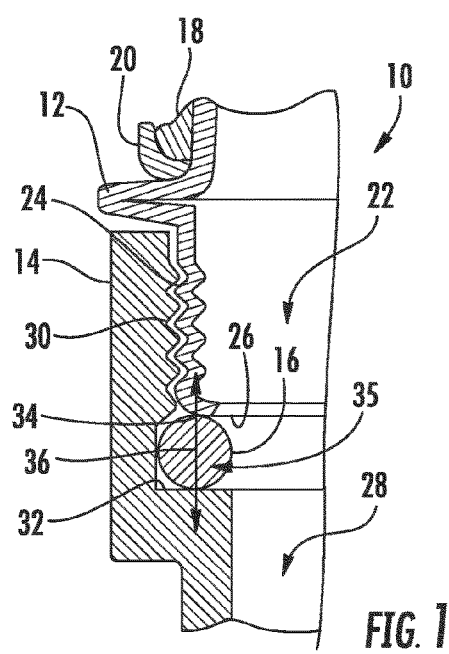
FIG. 1 is a cross sectional view of a portion of a prior art fluid system including a male connector, a female connector, and a seal member interposed therebetween.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

As shown in FIG. 1, a prior art fluid system 10 includes a male connector/fitting 12 connected to a female connector/fitting 14 and an o-ring seal member 16 interposed therebetween. The male connector 12 is connected to a hose 18 by a ferrule 20. The male connector 12 defines a fluid channel 22 that extends through the male connector, external threads 24, and a rolled seal face 26. The rolled seal face 26 is positioned against the o-ring seal 16. In another embodiment, the male connector 12 is the output of a spigot (not shown) or any other fluid device.

The female connector 14 is connected to a hose (not shown) and/or to another type of hose end product, such as a nozzle, a sprinkler, a valve, a fluid timer, or any other fluid device. The female connector 14 defines a fluid channel 28, internal threads 30, and a flat seal face 32. The fluid channel 28 extends through the female connector 14. The internal threads 30 are configured to engage the external threads 24 of the male connector 12 to connect the male connector to the female connector 14 and to fluidly couple the fluid channel 22 to the fluid channel 28. The seal face 32 is an annulus-shaped ledge (disk-shaped with a hole) against which the o-ring seal 16 is positioned. The seal face 32 and rolled seal face 26 combine to form a gland structure 35 to receive the o-ring seal 16.

Figure 2:
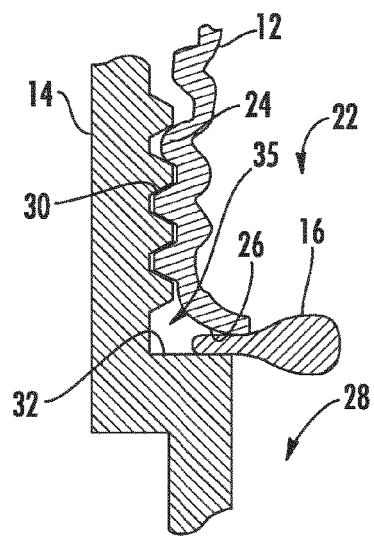
FIG. 2 is a cross sectional view of the fluid system of FIG. 1, with the male connector and the female connector being more tightly connected together, thereby causing a portion of the seal member to move into a fluid channel defined by the female connector.

As shown in FIG. 2, when the male connector 12 is more tightly connected to the female connector 14 and/or is over-tightened, the o-ring seal 16 is squeezed, extruded, and deformed into the fluid channels 22, 28 and away from the gland structure 35. One reason for the undesirable movement and extrusion of the o-ring seal 16 is that the seal face 26 of the male connector 12 and the seal face 32 of the female connector 14 are flat and are generally parallel to each other. Another reason is based on a location of a contact point 34 (FIG. 1) between the seal face 26 and the o-ring seal 16 being radially outward of a centerline 36 of the o-ring seal, as described below. This problem with the prior art fluid system 10 typically results in fluid leaks and slow drips between the male connector 12 and the female connector 14. Additionally, less fluid is able to flow through the fluid channels 22, 28 since they are partially obstructed by the o-ring seal 16.

Figure 3:
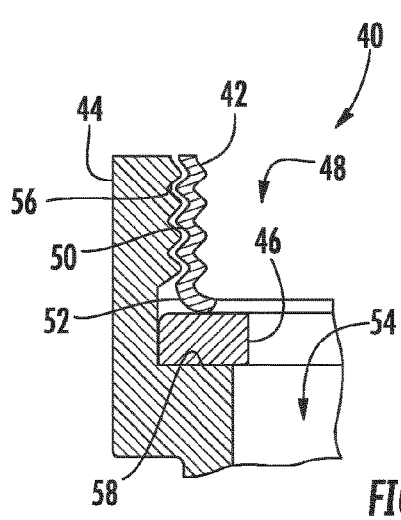
FIG. 3 is a cross sectional view of a portion of a prior art fluid system including a male connector, a female connector, and a seal member interposed therebetween.
Figure 4:
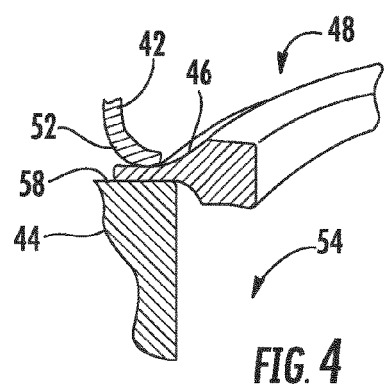
FIG. 4 is a cross sectional view of the fluid system of FIG. 3, with the male connector and the female connector being more tightly connected together, thereby causing a portion of the seal member to move into a fluid channel defined by the female connector.

With reference to FIGS. 3 and 4, another prior art fluid system 40 includes a male connector/fitting 42 connected to a female connector/fitting 44 and an o-ring seal 46 interposed therebetween. The male connector 42 defines a fluid channel 48 that extends through the male connector, external threads 50, and a rolled seal face 52. The rolled seal face 52 is positioned against the o-ring seal 46.

The female connector 44 defines a fluid channel 54, internal threads 56, and a flat seal face 58. The fluid channel 54 extends through the female connector 44. The internal threads 56 are configured to engage the external threads 50 of the male connector 42 to connect the male connector to the female connector 44 and to fluidly couple the fluid channel 48 to the fluid channel 54. The seal face 58 is an annulus-shaped (disk-shaped with a hole) ledge against which the o-ring seal 46 is positioned.

As shown in FIG. 4, when the male connector 42 is more tightly connected to the female connector 44 and/or is over-tightened, the o-ring seal 46 is squeezed, extruded, and/or deformed into the fluid channels 48, 54. As described above, this problem with the prior art fluid system 40 typically results in fluid leaks and slow drips between the male connector 42 and the female connector 44. Additionally, less fluid is able to flow through the fluid channels 48, 54 since they are partially obstructed by the squeezed, extruded, and/or deformed o-ring seal 46.

Figure 5:
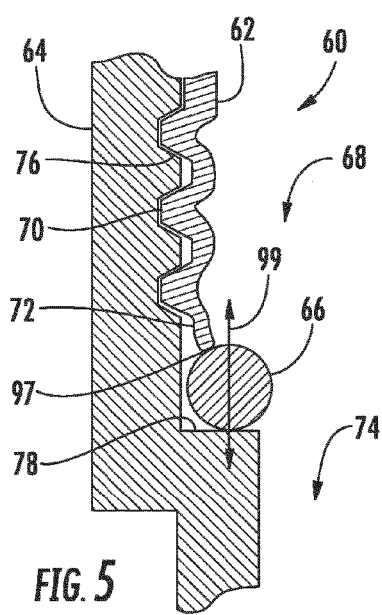
FIG. 5 is a cross sectional view of a portion of a prior art fluid system including a male connector, a female connector, and a seal member interposed therebetween.
Figure 6:
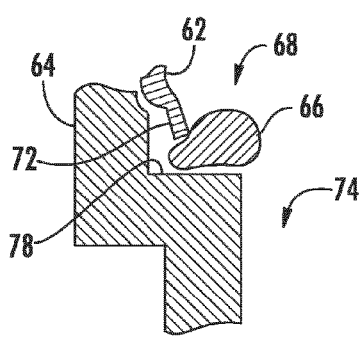
FIG. 6 is a cross sectional view of the fluid system of FIG. 5, with the male connector and the female connector being more tightly connected together, thereby causing a portion of the seal member to move into a fluid channel defined by the female connector.

Two additional prior art fluid systems 60, 80 are shown in FIGS. 5-8. In FIGS. 5 and 6, the fluid system 60 includes a male connector/fitting 62 connected to a female connector/fitting 64 and an o-ring seal 66 interposed therebetween. The male connector 62 defines a fluid channel 68 that extends through the male connector 62, external threads 70, and a rolled seal face 72. The rolled seal face 72 is positioned against the o-ring seal 66.

The female connector 64 defines a fluid channel 74, internal threads 76, and a flat seal face 78. The fluid channel 74 extends through the female connector 64. The internal threads 76 are configured to engage the external threads 70 of the male connector 62 to connect the male connector to the female connector 64 and to fluidly couple the fluid channel 68 to the fluid channel 74. The seal face 72 is an annulus-shaped (disk-shaped with a hole) ledge against which the o-ring seal 66 is positioned.

As shown in FIG. 6, when the male connector 62 is more tightly connected to the female connector 64 and/or is over-tightened, the o-ring seal 66 is squeezed, extruded, and/or deformed into the fluid channels 68, 74.

Figure 7:
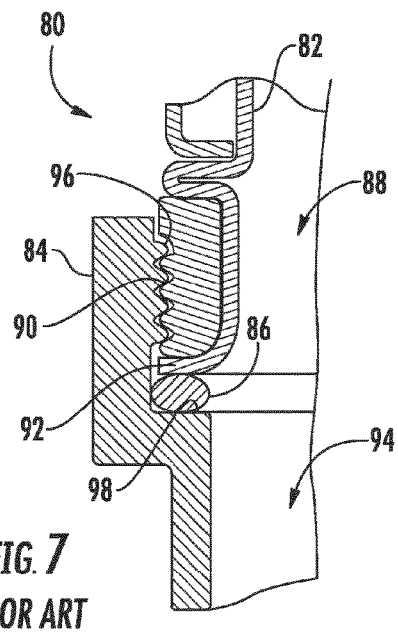
FIG. 7 is a cross sectional view of a portion of a prior art fluid system including a male connector, a female connector, and a seal member interposed therebetween.
Figure 8:
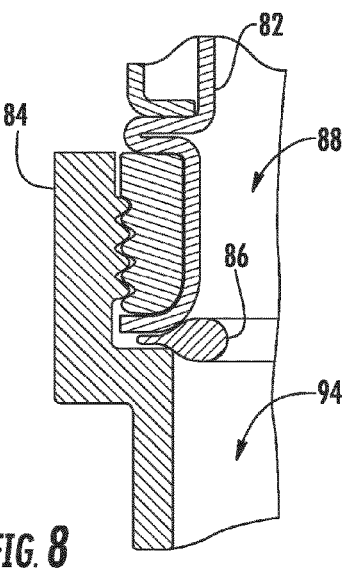
FIG. 8 is a cross sectional view of the fluid system of FIG. 7, with the male connector and the female connector being more tightly connected together, thereby causing a portion of the seal member to move into a fluid channel defined by the female connector.

In FIGS. 7 and 8, the fluid system 80 includes a male connector/fitting 82 connected to a female connector/fitting 84 and an o-ring seal 86 interposed therebetween. The male connector 82 defines a fluid channel 88 that extends through the male connector, external threads 90, and a rolled seal face 92. The rolled seal face 92 is positioned against the o-ring seal 86.

The female connector 84 defines a fluid channel 94, internal threads 96, and a flat seal face 98. The fluid channel 94 extends through the female connector 84. The internal threads 96 are configured to engage the external threads 90 of the male connector 82 to connect the male connector to the female connector 84 and to fluidly couple the fluid channel 88 to the fluid channel 94. The seal face 98 is an annulus-shaped (disk-shaped with a hole) ledge against which the o-ring seal 86 is positioned.

As shown in FIG. 8, when the male connector 82 is more tightly connected to the female connector 84 and/or is over-tightened, the o-ring seal 86 is squeezed, extruded, and/or deformed into the fluid channels 88, 94.

Each of the above fluid systems includes a seal face on the male connector that contacts the o-ring seal at a contact point located on a radially outward side (to the left in FIGS. 1-8) of a vertical center line through a cross section of the o-ring seal when the male connector 1 initially installed. For example, in FIGS. 5 and 6, the fluid system 60 includes the seal face 72, which is formed on the male connector 62. The seal face 72 contacts the o-ring seal 66 at the contact point 97, which is located on a radially outward side of the center line 99. As a result, tightening/over-tightening of the connectors typically results in inward compression/extrusion/deformation, which moves the o-ring seal out of its desired position, as described above. The fluid system 100 (FIG. 9) described herein addresses this issue so that tightening/over-tightening of the connectors does not displace or deform the o-ring seal to a position that results in fluid leakage and/or blockage of the fluid channels.

Figure 9:
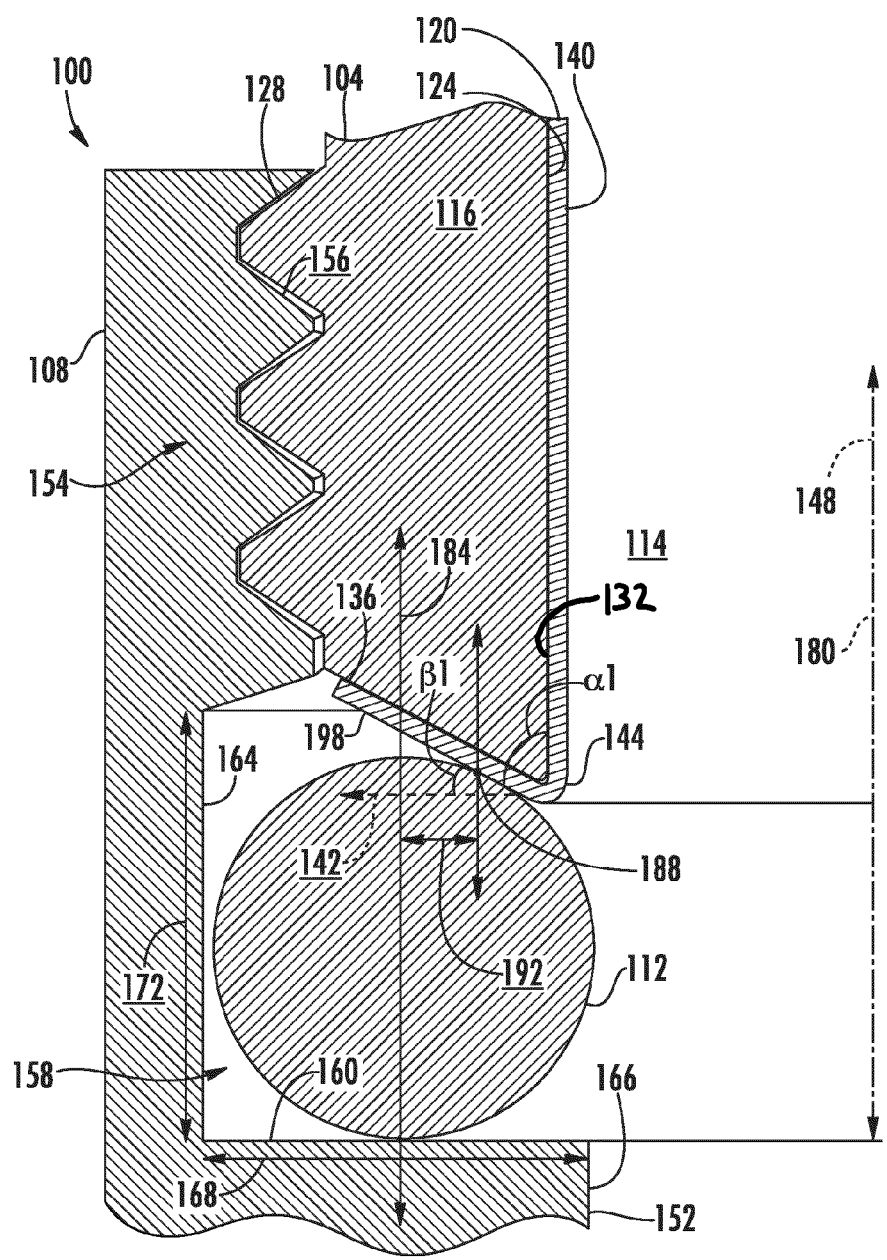
FIG. 9 is a cross sectional view of a portion of a fluid system, as described herein, including a male connector, a female connector, and a seal member interposed therebetween.

As shown in FIG. 9, a fluid system 100 includes a male connector/fitting member 104, a female connector/fitting member 108, and a seal member 112. The fluid system 100 is configured to function with any type of fluid including water, fluidic food products, petroleum products, and air and other gasses. In one example, the male connector 104 is connected to a pipe (not shown), a hose, and/or to another type of pipe/hose end product, such as a spigot, a nozzle, a sprinkler, a valve, or a fluid timer. In another embodiment, the male connector 104 is connected to any other type of fluid device that is suitable for the particular fluid with which the fluid system 100 is configured to function. The male connector 104 and the female connector 108 are also referred to herein as first and second connector members interchangeably.

The male connector 104 is generally annular in shape and approximately one quarter of the connector 104 is shown in the cross sectional view of FIG. 9. The remaining portion of the male connector 104 that is not shown FIG. 9 is substantially identical to the illustrated portion. The male connector 104 includes a coupling portion 114 and a seal structure 136 extending from the coupling portion. The coupling portion 114 includes a threaded ring 116 and a shank 120 extending therethrough. The threaded ring 116 defines a central opening 124 and external threads 128. The external threads 128 are sized to correspond to national hose thread standard; however, in other embodiments the external threads are any size, shape, and configuration as desired by those of ordinary skill in the art. The threaded ring 116 is generally cylindrical and is cast, molded, and/or machined from metal, plastic, and/or any other suitable material as desired by those of ordinary skill of the art. In one embodiment, the threaded ring 116 is machined from brass. In another embodiment of the male connector 104, the threaded ring 116 is integral with the shank 120, such that the threaded ring and the shank form a monolithic part.

The shank 120 extends along a longitudinal axis 148 of the male connector 104 and is formed from stamped metal. The shank 120 is generally cylindrical and defines a fluid channel 140 extending through the male connector 104. The shank 120 is configured to fit within the central opening 124 defined by the threaded ring 116. In another embodiment, the shank 120 is formed from any other material using any process as desired by those of ordinary skill in the art. Exemplary materials suitable for forming the shank 120 include rod brass, steel, stainless steel, other metals, and molded polymers. In yet another embodiment, the external threads 128 are formed on the shank 120 and the male connector 104 does not include the threaded ring 116.

With continued reference to FIG. 9, the seal structure 136, which is also referred to herein as a flange, extends from the shank 120 of the coupling portion 114 and is formed from the same material as the shank. An angle α1 is defined between the seal structure 136 and the axial portion 132. In one embodiment, the angle α1 is about seventy degrees, which includes angles ranging from sixty-five to seventy-five degrees. In another embodiment, the angle α1 defines a magnitude between approximately thirty degrees to eighty-five degrees. An angle β1 is defined between the seal structure 136 and a horizontal axis 142 that extends perpendicularly from the longitudinal axis 148. In one embodiment, the angle β1 is about twenty degrees, which includes angles ranging from fifteen to twenty-five degrees. In another embodiment, the angle β1 defines a magnitude between approximately five degrees to seventy degrees. The angle β1 is complementary to the angle α1, in at least some embodiments.

In another embodiment, a surface 198 of the seal structure 136 is textured or has a specialized finish applied thereto that further assists in forming a fluid tight seal between the seal structure 136 and the seal member 112. For example, in one embodiment, the surface 198 includes a seal bead (not shown) that includes one or more ridges. In another embodiment, the surface 198 is highly polished using a process such as micro finish.

A radiused portion 144 is defined at/near a junction of the seal structure 136 and the shank 120. It is desirable for a radius of the radiused portion 144 to be as small as is practical based on the material of the shank 120, the intended usage of the male connector 104, and the desired price point of the male connector. In one embodiment, the radius of the radiused portion 144 is about 0.020 inches, which includes radii of plus or minus approximately 0.005 inches. In another embodiment, the radius of the radiused portion 144 defines a magnitude between approximately 0.005 inches to 0.050 inches.

The female connector 108 is generally annular in shape and approximately one quarter of the connector 108 is shown in the cross sectional view of FIG. 9. The remaining portion of the female connector 108 that is not shown FIG. 9 is substantially identical to the illustrated portion. The female connector 108 is connected to a pipe (not shown), a hose, and/or to another type of pipe/hose end product, such as a spigot, a nozzle, a sprinkler, a valve, or a fluid timer.

The female connector 108 includes a coupling portion 154 and a seal structure 160 extending from the coupling portion. Additionally, the female connector 108 defines the longitudinal axis 148 and a fluid channel 152 that extends axially through the female connector 108.

The coupling portion 154 defines internal threads 156 that are configured to engage the external threads 128 of the coupling portion 114 to connect/couple/engage the male connector 104 with the female connector 108 and to fluidly couple the fluid channel 140 to the fluid channel 152. Typically, the coupling portion 154 is rotated relative to the coupling portion 114 to connect the connector 104, 108. In other embodiments, the coupling portions 114, 154 are configured for a different type of connection.

The seal structure 160 of the female connector 108 defines a gland structure 158 that is located between the male connector 104 and the female connector 108 when the connectors 104, 108 are threaded together. The gland structure 158 defines an annular seal face 160 and a seal wall 164. The seal face 160 is a generally annulus-shaped (disk-shaped with a hole) ledge against which a portion of the seal member 112 is positioned. The seal face 160 defines a channel opening 166 that defines the channel 152 and a radial width 168.

The seal wall 164 is a generally cylindrical wall located between the internal threads 156 and the seal face 160. The seal wall 164 extends from the seal face 160 and defines an axial height 172. The seal wall 164 and the seal face 160 are configured such that the seal member 112 is at least partially positioned in the gland structure 158.

With continued reference to FIG. 9, the seal member 112, which is also referred to herein as an o-ring seal or as including an o-ring seal, is formed from an elastomeric material. In the illustrated embodiment, the seal member 112 is a generally toroid-shaped o-ring defined about a longitudinal axis 180 that is at least approximately aligned with the longitudinal axis 148. The seal member 112 defines a centerline 184 that extends through a center of a portion of a cross section of the seal member, as shown in FIG. 9, parallel to the longitudinal axes 148, 180. In another embodiment, the seal member 112 is formed from any material and has any shape, as desired by those of ordinary skill in the art. For example, in one embodiment the seal member 112 has a rectangular cross section similar to the seal member shown in FIG. 3. In each embodiment, the seal member 112 defines a centerline that corresponds to the centerline 184.

To connect the male connector 104 and the female connector 108, the coupling portions 114, 154 are positioned to engage each other, and then the male connector is rotated relative to the female connector. As the male connector 104 is connected to the female connector 108, the seal member 112 becomes positioned between the seal structures 136, 160. In particular, when the male connector 104 is connected to the female connector 108 at a first tightness, the seal member 112 is seated in the gland structure 158 and the seal structure 136 is positioned against the seal member 112 at a generally tangential contact point 188. The contact point 188 is located radially inboard of the centerline 184 through the seal member 112. Specifically, the contact point 188 is located between the centerline 184 and the longitudinal axes 148, 180, and is radially spaced apart from the centerline 184 by a minimum inboard distance 192.

Figure 10:
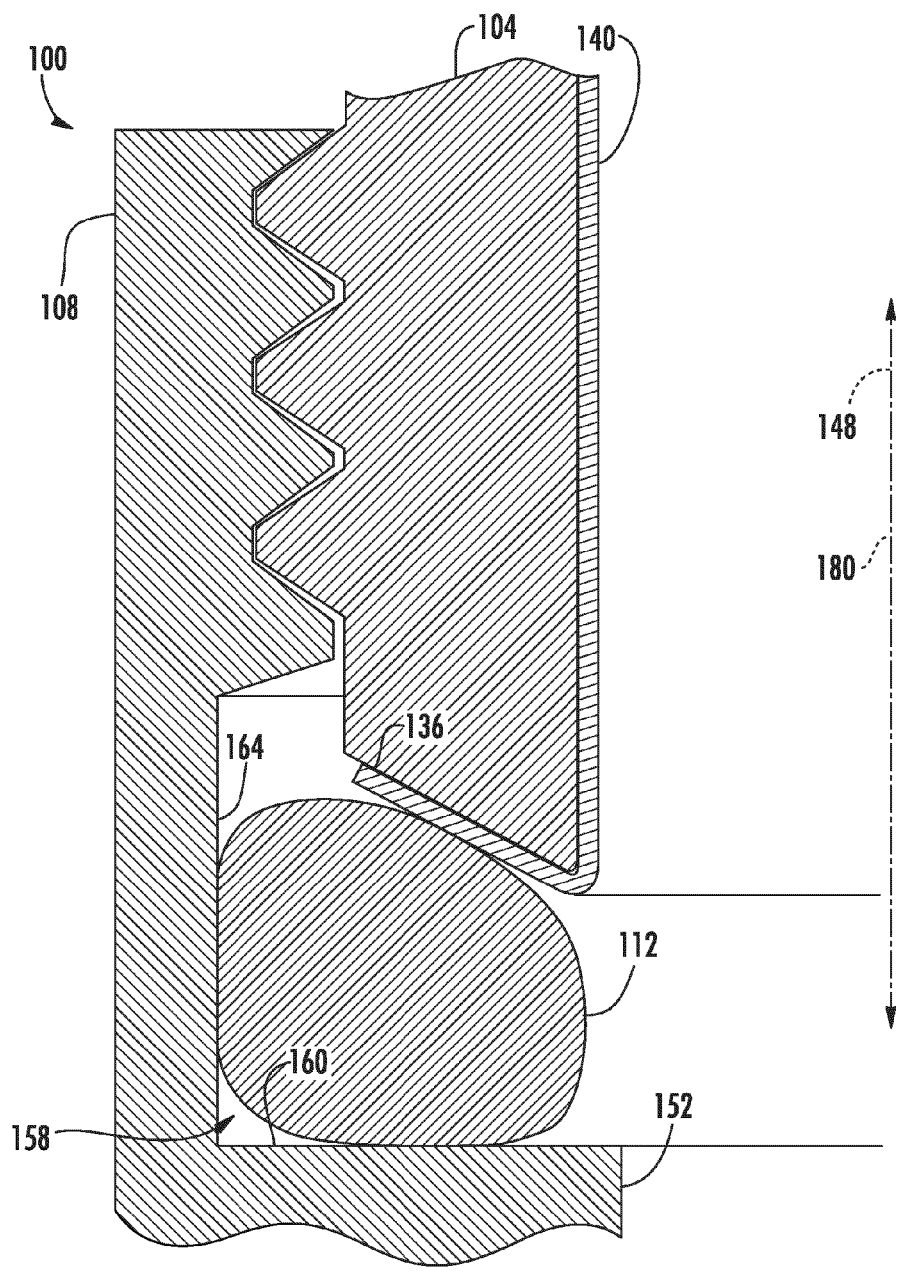
FIG. 10 is a cross sectional view of the fluid system of FIG. 9, with the male connector and the female connector being more tightly connected together without causing the seal member to move into a fluid channel defined by the female connector.

As shown in FIG. 10, continued rotation has caused the male connector 104 to be connected to the female connector 108 at a second tightness that is greater than the first tightness, which has moved the seal structure 136 toward gland structure 158. Due to the position of the contact point 188 (FIG. 9) being inboard of the centerline 184 (FIG. 9), as the tightness of the connectors 104, 108 is increased, the seal structure 136 rolls/pushes/extrudes (outward compression) the seal member 112 away from the longitudinal axes 148, 180 and against the seal face 160 and the seal wall 164 of the gland structure 158. Additionally, the seal structure 136 is moved away from the channels 140, 152 and the channel opening 166. Accordingly, the increased tightness, including an over-tight condition, does not cause the seal member 112 to move to a position that results in fluid leaks, slow drips, and blocked channels, as is the case with the prior art fluid systems (see FIGS. 1-8). Instead, the seal member 112 forms a fluid tight seal against the seal structures 136, 160 that couples the channels 140, 152 and completely prevents fluid leaks between the connectors 104, 108.

Figure 11:
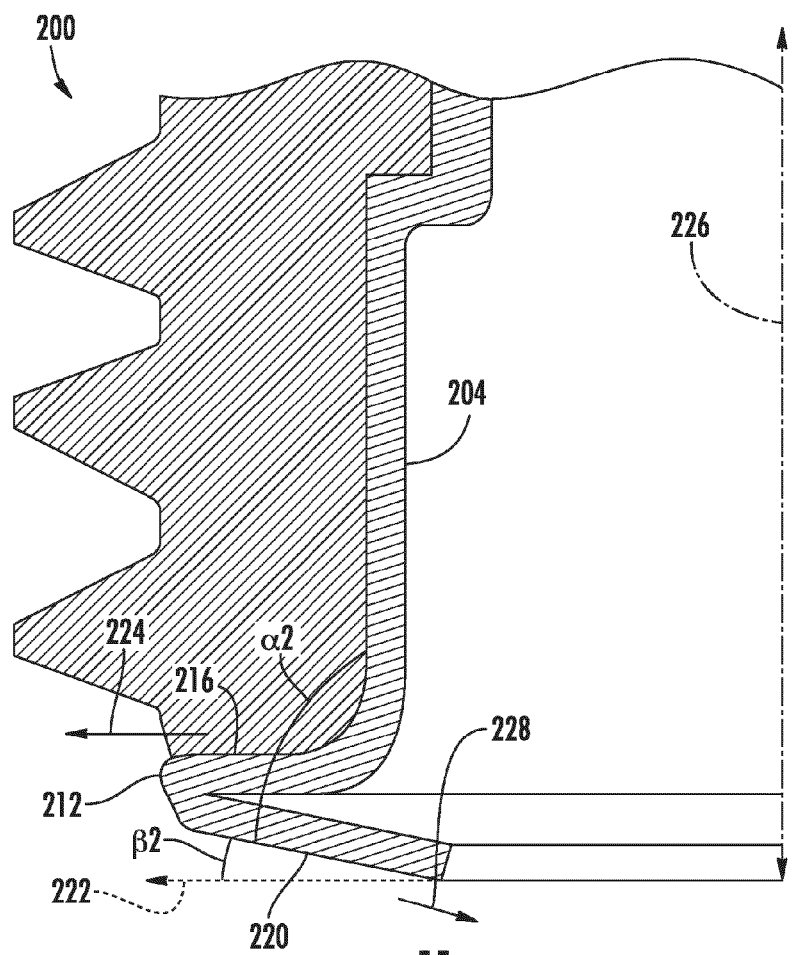
FIG. 11 is a cross sectional view of a portion of another embodiment of a male connector, as described herein.

With reference to FIG. 11, a male connector 200 is substantially identical to the male connector 104 except for the following differences. The male connector 200 includes a shank 204 and a seal structure 212 extending therefrom. The seal structure 212 includes a first seal structure portion 216 and a second seal structure portion 220. The first seal structure portion 216 extends from the shank 204 in a radially outward direction 224 with respect to a longitudinal axis 226 of the male connector 200. The second seal structure portion 220 extends from the first seal structure portion 216 in a radially inward direction 228 that is different than the direction 224.

An angle $\alpha 2$ is defined between the second seal structure portion 220 and the shank 204. In one embodiment, the angle $\alpha 2$ is about seventy degrees, which includes angles ranging from sixty-five to seventy-five degrees. In another embodiment, the angle $\alpha 2$ defines a magnitude of approximately thirty degrees to eighty-five degrees. An angle $\beta 2$ is defined between the second seal structure portion 220 and a horizontal axis 222 that extends radially from the longitudinal axis 226. In one embodiment, the angle $\beta 2$ is about twenty degrees, which includes angles ranging from nineteen to twenty-one degrees. In another embodiment, the angle $\beta 2$ defines a magnitude of approximately five degrees to seventy degrees. The second seal structure portion 220 is configured to roll/push/deform the seal member 112 (FIGS. 9 and 10) radially outward (outward compression/extrusion) with respect to the longitudinal axis 226, in the same manner as the seal structure 136 (FIGS. 9 and 10).

Figure 12:
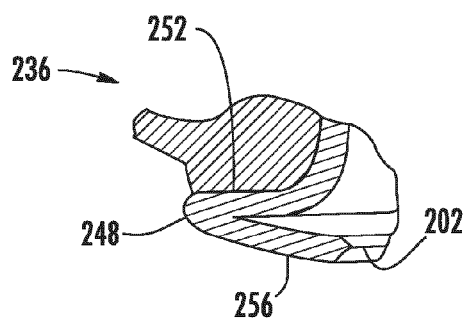
FIG. 12 is a cross sectional view of a portion of another embodiment of a male connector, as described herein.

FIG. 12 shows a male connector 236 that is substantially identical to the male connector 200 except that the male connector 236 includes a seal structure 248 that defines a beveled edge 202. In particular, the seal structure 248 includes a first seal structure portion 252 and a second seal structure portion 256. The second seal structure portion 256 is configured to roll/push/deform the seal member 112 (FIGS. 9 and 10) radially outward (outward compression/extrusion) in same manner as the seal structure 136 (FIGS. 9 and 10).

The beveled edge 202 is formed on the second seal structure portion 256. The beveled edge 202 is configured to minimize and/or eliminate abrasions on the seal member 112 (FIG. 9), which may be caused by contact between the seal structure 248 and the second seal structure portion 256.

Figure 13:
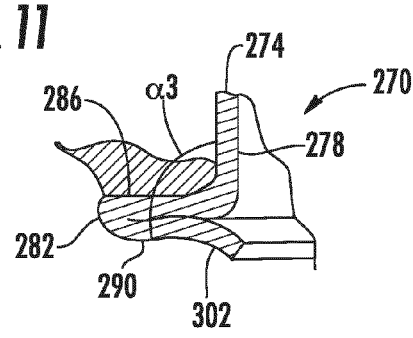
FIG. 13 is a cross sectional view of a portion of another embodiment of a male connector, as described herein.

As shown in FIG. 13, another male connector 270 is substantially identical to the male connector 200 except the male connector 270 includes a seal structure 282 that defines a curled edge 302. The seal structure 282 includes a first seal structure portion 286 and a second seal structure portion 290. An angle $\alpha 3$ is defined between the second seal structure portion 290 and the axial portion 278. In one embodiment, the angle $\alpha 3$ is about ninety degrees, which includes angles ranging from eighty to ninety-five degrees. In another embodiment, the angle $\alpha 4$ defines a magnitude between approximately thirty degrees to one hundred degrees.

At least the curled edge 302 of the second seal structure portion 290 is configured to roll/push/deform the seal member 112 (FIGS. 9 and 10) radially outward (outward compression/extrusion), with respect to the longitudinal axes 148, 180 (FIGS. 9 and 10) in same manner as the seal structure 136 (FIGS. 9 and 10). Additionally, the curled edge 302 reduces turbulence in a fluid stream (not shown) configured to pass through the connector 270.

As shown in FIG. 14, a male connector 306 is substantially identical to the male connector 104 except that the connector 306 is integrally formed as a monolithic part and does not include the threaded ring 116. Instead, the male connector 306 includes a shank 310 including a coupling portion 314 and a seal structure 318. External threads 322, which are substantially identical to the external threads 128, are defined by the coupling portion 314. The seal structure 318 extends from the coupling portion 314, and an angle $\rho 1$ is defined between the seal structure and a longitudinal axis 326 of the shank 310. In one embodiment, the angle $\rho 1$ is about seventy degrees, which includes angles ranging from sixty-five to seventy-five degrees. In another embodiment, the angle $\rho 1$ defines a magnitude between approximately thirty degrees to eighty-five degrees. An angle $\omega 1$ is defined between the seal structure 318 and a horizontal axis 328 that extends radially from the longitudinal axis 326. In one embodiment, the angle $\omega 1$ is about twenty degrees, which includes angles ranging from nineteen to twenty-one degrees. In another embodiment, the angle $\omega 1$ defines a magnitude between approximately five degrees to seventy degrees. The seal structure 318 is configured to roll/push/deform the seal member 112 (FIGS. 9 and 10) radially outward (outward compression/extrusion), with respect to the longitudinal axis 326 in same manner as the seal structure 136 (FIGS. 9 and 10).

As shown in FIG. 15, another male connector 330 is substantially identical to the male connector 104 (FIG. 9). The male connector 330 defines a coupling portion 331 that includes a threaded ring 332 and a shank 333 extending therethrough. A seal structure 335 extends from the shank 333.

As shown in FIG. 16, a male connector 334 is substantially identical to the male connector 104 except that the male connector 334 is integrally formed as a monolithic part. The male connector 334 does not include the threaded ring 116. Instead, the male connector 334 includes a shank 338 including a coupling portion 342 and a seal structure 346. External threads 350, which are substantially identical to the external threads 128, are defined by the coupling portion 342. The seal structure 346 extends from the coupling portion 342, and an angle $\rho 2$ (also shown in FIG. 19) is defined between the seal structure and a longitudinal axis 354 of the shank 338. In one embodiment, the angle $\rho 2$ is about seventy degrees, which includes angles ranging from sixty-five to seventy-five degrees. In another embodiment, the angle $\rho 2$ defines a magnitude between approximately thirty degrees to eighty-five degrees. An angle $\omega 2$ is defined between the seal structure 346 and a horizontal axis 356 that extends radially from the longitudinal axis 354. In one embodiment, the angle $\omega 2$ is approximately twenty degrees plus or minus approximately one degree. In another embodiment, the angle $\omega 2$ defines a magnitude between approximately five degrees to seventy degrees. The seal structure 346 is configured to roll/push/deform the seal member 112 (FIGS. 9 and 10) radially outward (outward compression/extrusion), with respect to the longitudinal axis 354 in same manner as the seal structure 136 (FIGS. 9 and 10).

Figure 17:
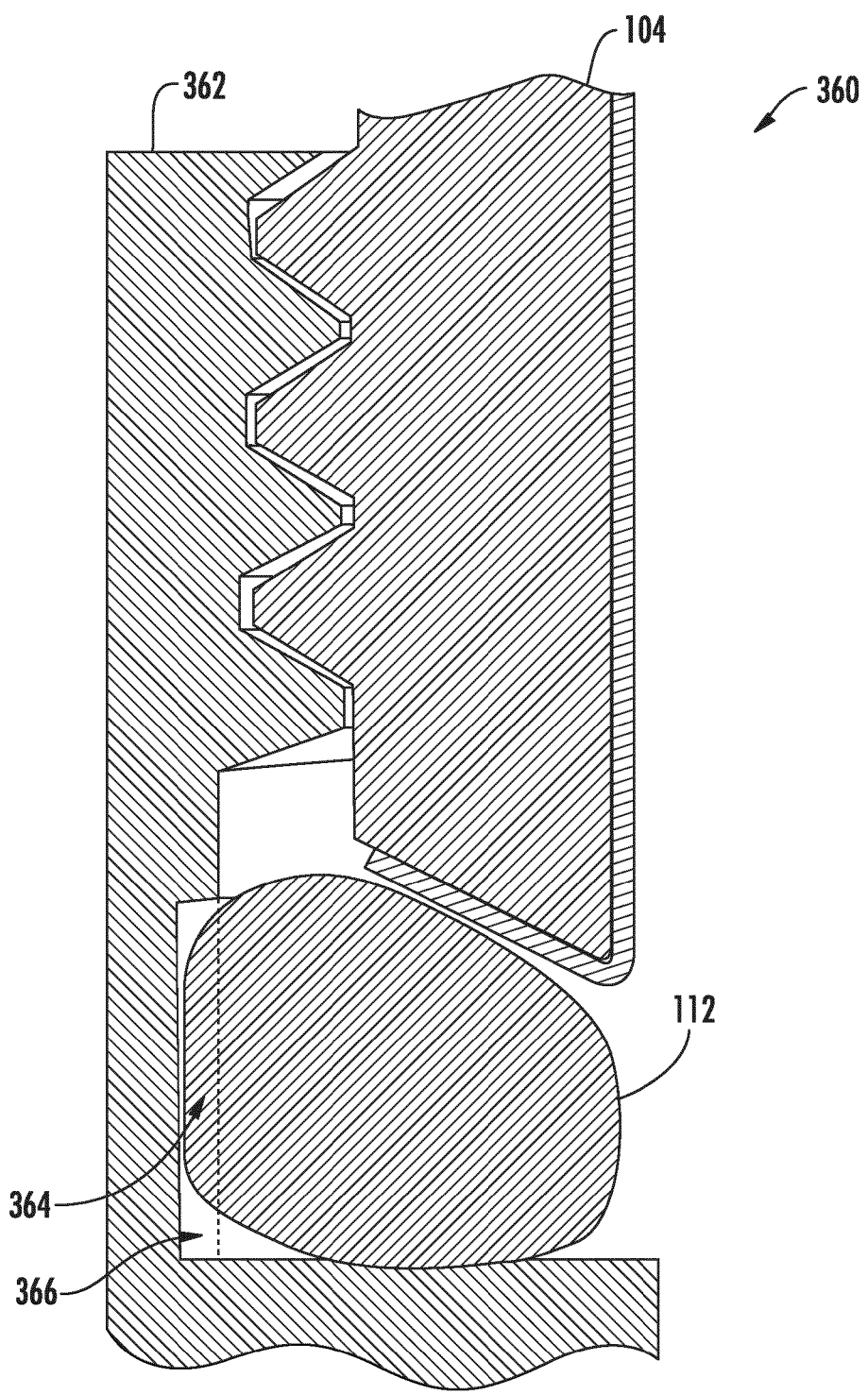
FIG. 17 is a cross sectional view of a portion of another embodiment of a fluid system, as described herein, including a female connector defining a retention cavity, a male connector, and a seal member interposed therebetween and partially positioned within the retention cavity.

With reference to FIG. 17, another embodiment of a fluid system 360 is substantially identical to the fluid system 100 except that the fluid system 360 includes a female connector 362 that defines a retention cavity 364. The retention cavity 364 is in fluid communication with a gland structure 366 of the female connector 362 and is provided as a generally tube-shaped void. In another embodiment, the retention cavity 364 is any shape as desired by those of ordinary skill in the art and is typically based on the shape of the seal member 112.

The retention cavity 364 is configured to at least partially retain the seal member 112 when the male connector 104 is disconnected from the female connector 362, due at least partially to the resiliency of the seal member. The retention cavity 364 is also configured to receive the seal member 112 in response to the outward compression/extrusion of the seal member, which is generated when the male connector 104 and the female connector 364 are connected.

Figure 18:
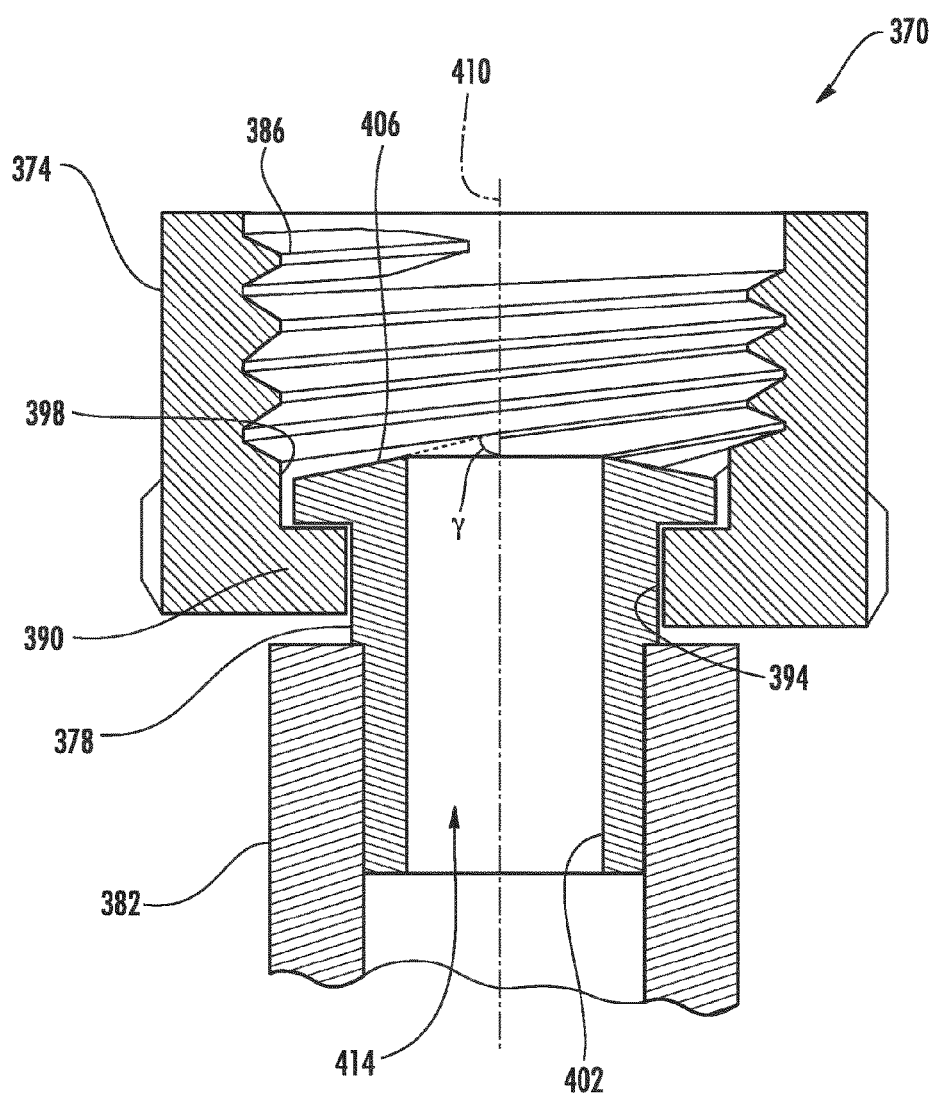
FIG. 18 is a cross sectional view of a female connector of another embodiment of a fluid system, as described herein.

As shown in FIG. 18, a female connector 370 includes a connection ring 374, a channel structure 378, and a base element 382. The connection ring 374 is generally cup shaped. The connection ring 374 defines internal threads 386, a lip structure 390, and an opening 394 extending through the lip structure. At least a portion of the internal threads 386 define an axial seal wall 398 that is similar to the seal wall 164, except that the seal wall 398 includes a portion of the internal threads 386. The connection ring 374 may be formed from rod brass, steel, stainless steel, other metals, molded polymers, and/or any material as desired by those of ordinary skill in the art.

The channel structure 378 includes a body 402 and a seal structure 406. The channel structure 378 is formed from rod brass, steel, stainless steel, other metals, molded polymers, and/or any material as desired by those of ordinary skill in the art. The body 402 is generally cylindrical and defines a longitudinal axis 410 and a fluid channel 414 extending therethrough.

An angle γ is defined between the seal structure 406 and the longitudinal axis 410. In one embodiment, the angle γ is about seventy degrees, which includes angles ranging from sixty-five to seventy-five degrees. In another embodiment, the angle γ defines a magnitude between approximately thirty degrees to eighty-five degrees. The angle of the seal structure 406 may also be measured relative to a horizontal axis (not shown) that extends radially outward from the longitudinal axis 410, in which case the angle of the seal structure is approximately twenty degrees, plus or minus approximately one degree.

The base element 382 is connected to the body 402 on a side opposite from the seal structure 406. The base element 382 is sonic welded to the body 402. In another embodiment, the base element 382 is spin welded, press-fit, threadingly engaged to the body 402, or connected using any other desired process. The base element 382 is formed from rod brass, steel, stainless steel, other metals, molded polymers, and/or any material as desired by those of ordinary skill in the art.

Figure 19:
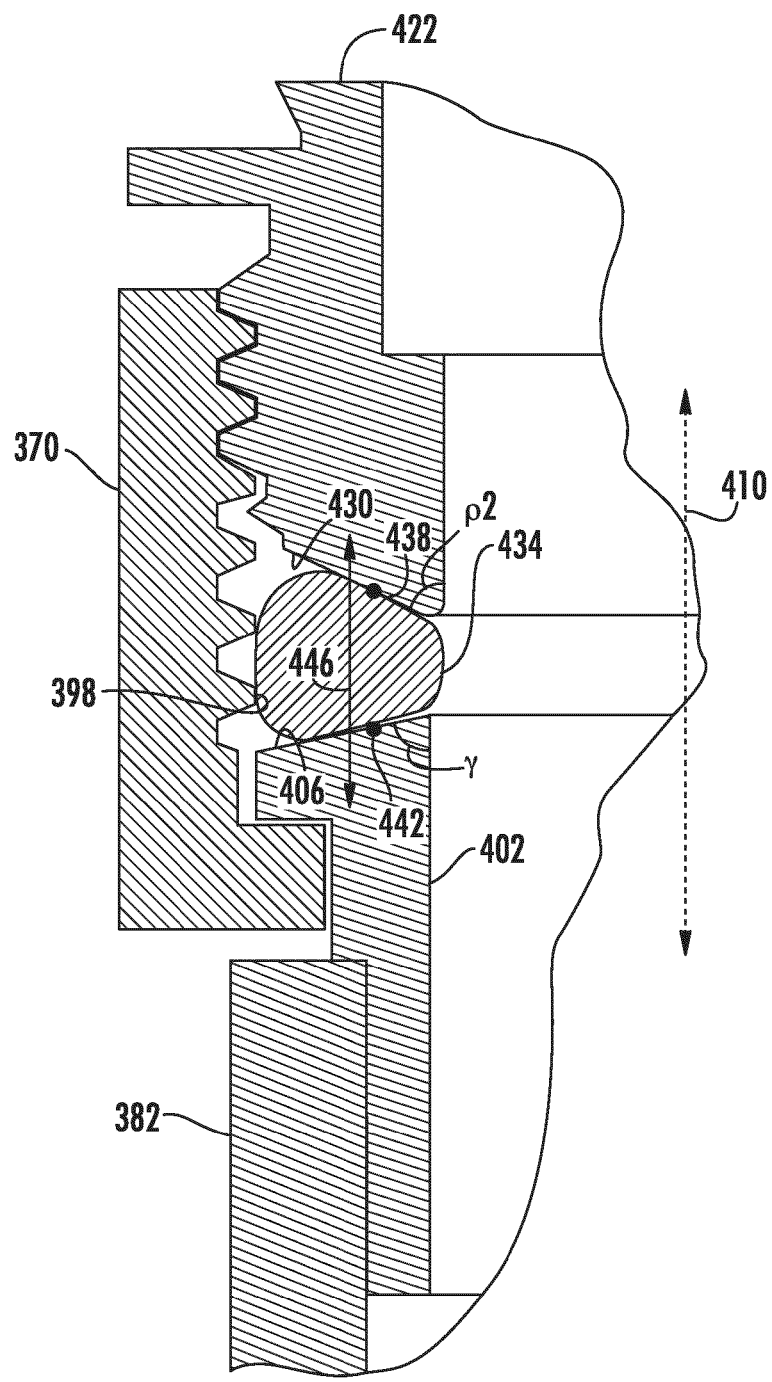
FIG. 19 is a cross sectional view of the fluid system of FIG. 18, showing the female connector connected to a male connector and including a seal member interposed between the female connector and the male connector.

As shown in FIG. 19, the female connector 370 is connected to a male connector 422 that is substantially identical to the male connector 334 of FIG. 16. The male connector 422 includes a seal structure 430 that is substantially identical to the seal structure 136. When the male connector 422 is connected to the female connector 370 the seal structure 430 and the seal structure 406 are configured to contact the seal member 434 at generally tangential contact points 438, 442 (the seal member 434 is shown compressed in FIG. 19). The contact points 438, 442 are located inboard of a centerline 446 through the seal member 434. In particular, the contact points 438, 442 are located between the centerline 446 and the longitudinal axis 410. With respect to the longitudinal axis 410, the contact points 438, 442 are located radially inward of the centerline 446.

Due to the position of the contact points 438, 442 being inboard of the centerline 446, as the connectors 370, 422 are tightened together the seal structure 430 and the seal structure 406 roll/push/deform the seal member 434 radially outward (outward compression/extrusion), with respect to the longitudinal axis 410, against the seal wall 398. The seal member 434 forms a fluid tight seal against the seal face 430, the seal structure 406, and the seal wall 398 that completely prevents fluid leaks between the connectors 370, 422.

As shown in FIG. 20, a female connector 450 is substantially identical to the female connector 370, except that the female connector 450 includes a connection ring 454 and channel structure 458 that are integrally formed. A seal structure 462 defined by the female connector 450 is also integrally formed with the connection ring 454 and the channel structure 458.

With reference to FIG. 21, a female connector 470 is substantially identical to the female connector 370, except that the body 474 is formed from a stamped material, such as metal.

With reference to FIG. 22, a female connector 478 is substantially identical to the female connector 470, except that the body 482 is formed from a stamped material and a lip structure 486 is angled with respect to a horizontal axis (not shown).

As shown in FIG. 23, a female connector 490 is substantially identical to the female connector 454, except that the female connection 490 includes a connection ring 494 and channel structure 498 that are integrally formed as a monolithic part. A seal structure 502 defined by the female connector 490 is also integrally formed with the connection ring 494 and the channel structure 498.

Figure 24:
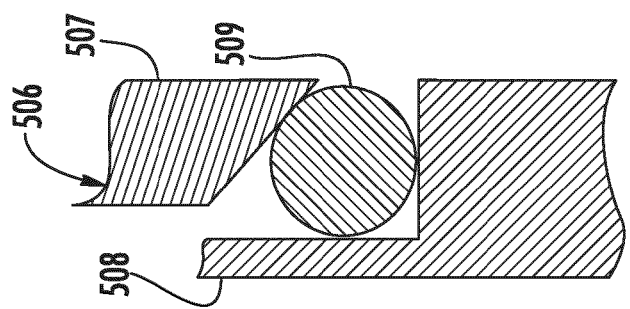
FIG. 24 is a cross sectional view of a portion of another embodiment of a fluid system, as described herein, including a male connector, a female connector, and a seal member interposed therebetween.

With reference to FIG. 24 another embodiment of a fluid system 506 includes a male connector 507 and a female connector 508. A seal member 509 is positioned between the male connector 507 and the female connector 508. The male connector 507 is substantially identical to the male connector 334 of FIG. 16. The female connector 508 is substantially identical to the female connector 64 of FIGS. 5 and 6. The male connector 507 is usable with the female connector 508 to roll/push/deform the seal member 509 radially outward and away from a longitudinal axis (see e.g. longitudinal axis 354 of FIG. 16) during connection of the male connector 507 and the female connector 508. The structure of the male connector 507 is configured to prevent fluid leaks between the connectors.

Figure 25:
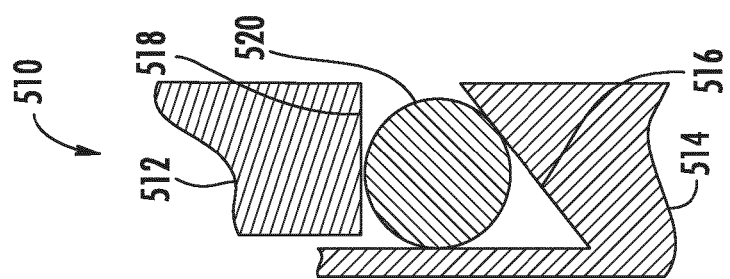
FIG. 25 is a cross sectional view of a portion of another embodiment of a fluid system, as described herein, including a male connector, a female connector, and a seal member interposed therebetween.

With reference to FIG. 25 another embodiment of a fluid system 510 includes a male connector 512, a female connector 514, and a seal member 520 that is positioned therebetween. The male connector 512 defines a flat seal structure 518. The female connector 514 defines an angled seal structure 516 that corresponds in function to the seal structure 136. The female connector 514 is usable with the male connector 512 to push/move/roll/extrude the seal member 520 radially outward and away from a longitudinal axis (see e.g. longitudinal axis 354 of FIG. 16) during connection of the male connector 512 and the female connector 514. The structure of the female connector 514 is configured to prevent fluid leaks between the connectors.

Figure 26:
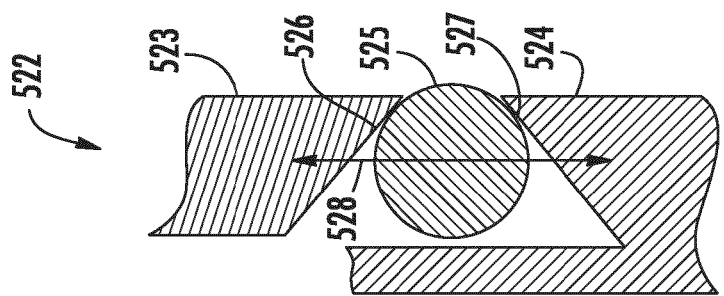
FIG. 26 is a cross sectional view of a portion of another embodiment of a fluid system, as described herein, including a male connector, a female connector, and a seal member interposed therebetween.

As shown in FIG. 26 another embodiment of a fluid system 522 includes a male connector 523, a female connector 524, and a seal member 525 that is positioned therebetween. The male connector 523 is substantially identical to the male connector 507 of FIG. 24. The female connector 524 is substantially identical to the female connector 514 of FIG. 25. Each connector 523, 524 defines a contact point 526, 527 that is positioned radially inward of a center line 528 through the seal member. The female connector 524 is usable with the male connector 523 to roll/push/deform the seal member 525 radially outward from a longitudinal axis (see e.g. longitudinal axis 354 of FIG. 16) during connection of the male connector 523 and the female connector 524. The structure of the connectors 523, 524 is configured to prevent fluid leaks between the connectors.

Figure 27:
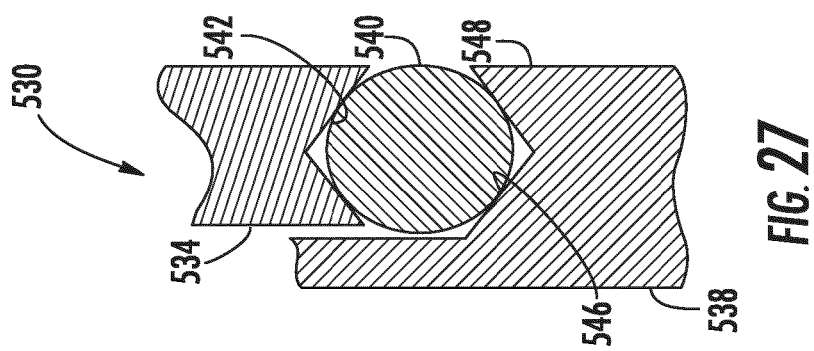
FIG. 27 is a cross sectional view of a portion of another embodiment of a fluid system, as described herein, including a male connector, a female connector, and a seal member interposed therebetween.

With reference to FIG. 27, another embodiment of a fluid system 530 is substantially identical to the fluid system 100 and includes a male connector 534 connected to a female connector 538 with a seal member 540 positioned therebetween. The male connector 534 defines a seal structure 542 having a "V"-shaped notch in cross section. The female connector 538 defines a seal structure 546 having a "V"-shaped notch in cross section. During connection of the male connector 534 and the female connector 538, the seal structures 542, 546 prevent movement of the seal member 540 toward a channel 548 defined by the female connector 538 and the o-ring 540 is deformed into the seal faces 542, 546.

Figure 28:
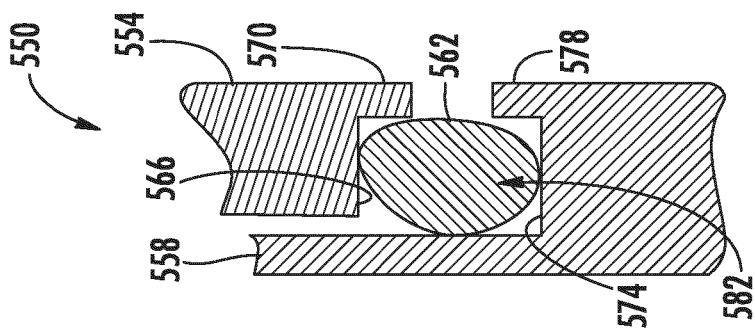
FIG. 28 is a cross sectional view of a portion of another embodiment of a fluid system, as described herein, including a male connector, a female connector, and a seal member interposed therebetween.

As shown in FIG. 28 another embodiment of a fluid system 550 includes a male connector 554 connected to a female connector 558 with a seal member 562 interposed therebetween. The male connector 554 defines a seal structure 566 that includes a retention feature 570 extending therefrom. The female connector 558 defines another seal structure 574 that includes another retention feature 578 extending therefrom. The retention features 570, 578 prevent movement of the seal member 562 out of a gland structure 582 defined by the seal structures 566, 574 and the retention features 570, 578.

Figure 29:
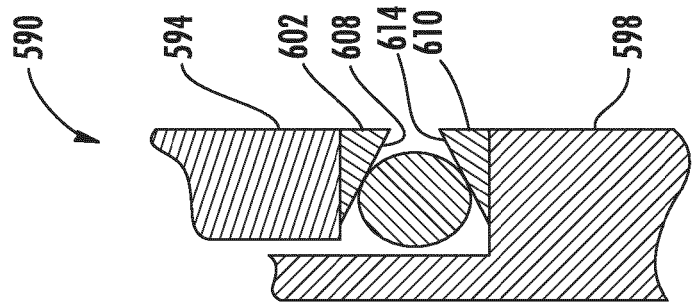
FIG. 29 is a cross sectional view of a portion of another embodiment of a fluid system, as described herein, including a male connector, a female connector, and a seal member interposed therebetween.

With reference to FIG. 29 another embodiment of a fluid system 590 is substantially identical to the fluid system of FIG. 19 and includes a male connector 594 and a female connector 598. The male connector 594 includes a component 602 that defines a seal structure 608 corresponding to the seal structure 430 of FIG. 19. The female connector 598 includes another component 610 that defines a seal structure 614 corresponding to the seal structure 406. The components 602, 610 are formed from an elastomeric material or any other material as desired by those of ordinary skill in the art, and are connected to a respective one of the connectors 594, 598.

Figure 30:
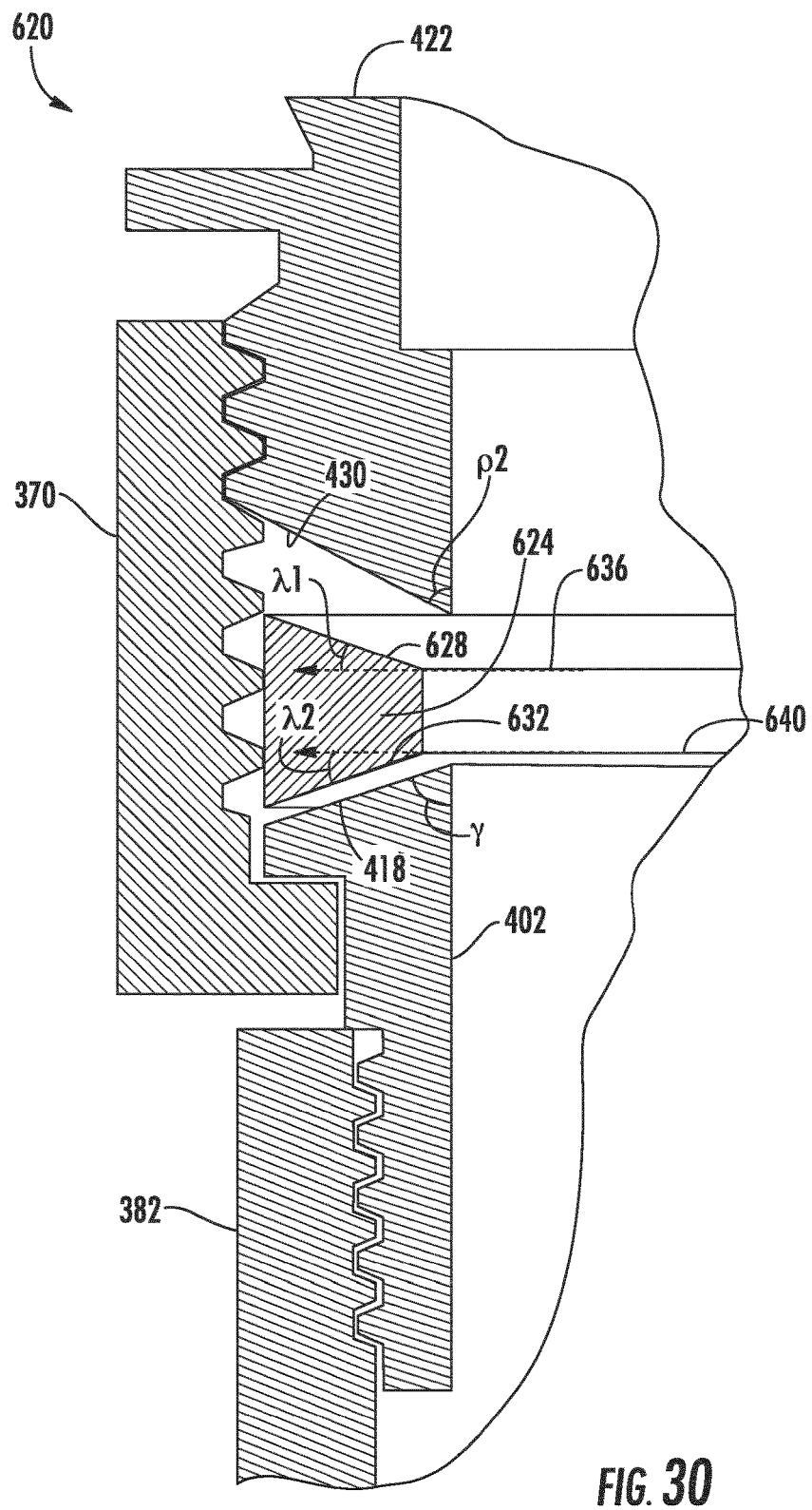
FIG. 30 is a cross sectional view of a portion of another embodiment of a fluid system, as described herein, including a male connector, a female connector, and a seal member interposed therebetween, with the seal member defining an angled upper seal structure and an angled lower seal structure.
Figure 31:
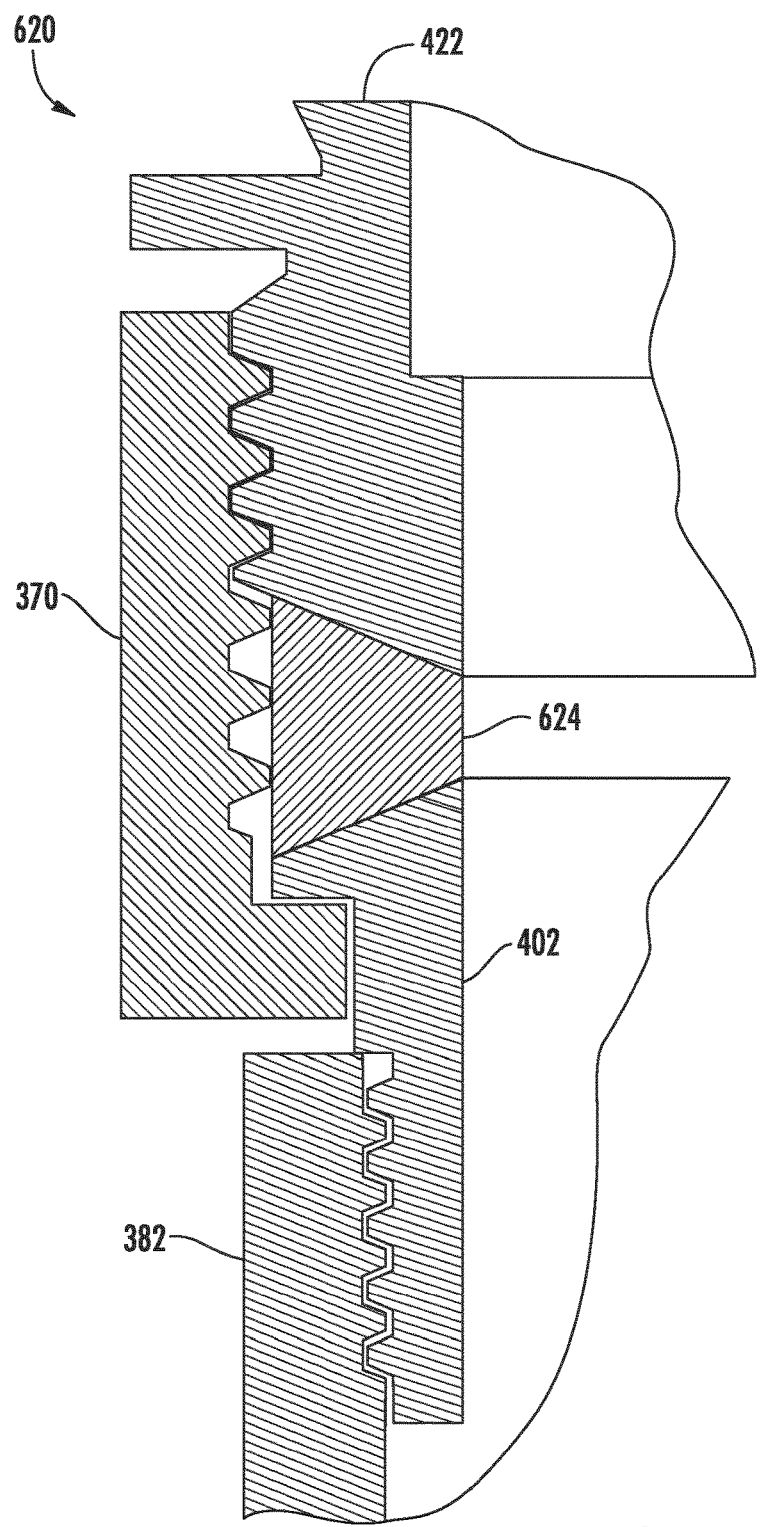
FIG. 31 is a cross sectional view of the fluid system of FIG. 30, with the male connector and the female connector being more tightly connected together without causing the seal member to move into a fluid channel defined by the female connector.

As shown in FIGS. 30 and 31, another embodiment of the fluid system 620 is substantially identical to the fluid system of FIG. 19, except for the following differences. Instead of having a seal member 434 (FIG. 19) with a circular cross section, the fluid system 620 includes a seal member 624 with a trapezoidal cross section.

The seal member 624 defines an upper seal surface 628 and a lower seal surface 632. The upper seal surface 628 is formed at an angle $\lambda 1$ from an edge 636 of the seal member 624. The upper seal surface 628 is configured to contact the seal structure 430 when the male connector 422 is connected to the female connector 370. The lower seal surface 632 is formed at an angle $\lambda 2$ from an edge 640 of the seal member. The lower seal surface 632 is configured to contact the seal structure 406 when the male connector 422 is connected to the female connector 370. In one embodiment, the angle $\lambda 1$ is the same as the angle $\rho 2$, and the angle $\lambda 2$ is the same as the angle $\gamma$. In another embodiment, the angle $\lambda 1$ is different than the angle $\rho 2$, and the angle $\lambda 2$ is different than the angle $\gamma$.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A seal system comprising:
    a first connector member defining a longitudinal axis and an oblique face disposed at an acute internal angle defined between the oblique face and the an axial portion of the first connector member relative to the longitudinal axis, and including external threads;
    a shank coupled to the first connector member and including a flange defining a first seal structure conforming to the oblique face;
    a second connector member including internal threads configured for connection to the first connector member;
    a gland structure coupled to the second connector and including a second seal structure defining an annular seal face arranged substantially perpendicular to the longitudinal axis and a seal wall arranged substantially normal to the seal face; and
    a seal member at least partially positioned in the gland structure,
    wherein the first seal structure and the second seal structure are configured to deform the seal member therebetween and into the gland structure in response to connection of the first connector member and the second connector member.

2. The seal system of claim 1 wherein:
    the first seal structure and the second seal structure are configured to deform the seal member away from the longitudinal axis in response to connection of the first connector member and the second connector member.

3. The seal system of claim 1 wherein:
    the seal member includes an o-ring,
    the o-ring defines a centerline that extends parallel to the longitudinal axis, and
    a contact point of the first seal structure against the o-ring is located between the centerline and the longitudinal axis.

4. The seal system of claim 1 wherein:
    in further response to connection of the first connector member and the second connector member, the first seal structure and the second seal structure are configured to force the seal member against the annular seal face.

5. The seal system of claim 4 wherein:
    in further response to connection of the first connector member and the second connector member, the first seal structure and the second seal structure are configured to force the seal member against the seal wall.

6. A connector system comprising:
    a first connector member defining a first channel therethrough and a longitudinal axis, and including a first coupling portion and a first seal structure including a surface extending from the first channel at an acute internal angle defined between the surface and the first channel relative to the longitudinal axis;
    a second connector member defining a second channel therethrough and including a second coupling portion configured to engage the first coupling portion to couple the first channel to the second channel, and a second seal structure extending from the second coupling portion and including an annular seal face arranged substantially perpendicular to the longitudinal axis and a seal wall arranged substantially normal to the annular seal face; and a seal member at least partially received by one of the first seal structure and the second seal structure, wherein the first seal structure and the second seal structure are configured to deform the seal member away from the longitudinal axis when the first coupling portion and the second coupling portion are engaged.

7. The seal system of claim 1 wherein:
the shank is formed of a different material than the first connector member.

8. The seal system of claim 1 wherein:
the shank is formed of a stamped metal.

9. The seal system of claim 1 wherein:
the acute internal angle is about seventy degrees.

10. The seal system of claim 1 wherein:
the annular seal face defines a second channel opening, and
the seal member is deformed away from the second channel opening.

11. The seal system of claim 1 wherein:
an angle formed between the annular seal face and the first seal structure is about thirty degrees.

12. The connector system of claim 6 wherein:
the annular seal face defines a channel opening, and the first seal structure and the second seal structure are further configured to deform the seal member away from the channel opening when the first coupling portion and the second coupling portion are engaged.

13. The connector system of claim 6 wherein:
the annular seal face and the annular seal face and the seal wall define a gland structure, and
the first seal structure and the second seal structure are further configured to deform the seal member into the gland structure when the first coupling portion and the second coupling portion are engaged.

14. The connector system of claim 6 wherein:
the seal member includes an o-ring,
the o-ring defines a centerline that extends parallel to the longitudinal axis, and
in response to engagement of the first coupling portion and the second coupling portion a contact point of the first seal structure against said o-ring is located between the centerline and the longitudinal axis.

15. The connector system of claim 6 wherein:
the acute internal angle is about seventy degrees.

16. The connector system of claim 6 wherein the first seal structure defines a curled edge configured to reduce turbulence in a fluid stream through the first channel and the second channel.

17. A method of manipulating a connector system comprising:
engaging a first coupling portion of a first connector member with a second coupling portion of a second connector member, the first connector member defining a first channel therethrough and including a surface extending from the first channel at an acute internal angle defined between the surface and the first channel, and the second connector member defining a second channel therethrough;
positioning a first seal structure extending from the first coupling portion and a second seal structure extending from the second coupling portion against a seal member at least partially received by a gland structure located between the first connector member and the second connector member and defining an annular seal face arranged substantially perpendicular to the longitudinal axis and a seal wall arranged substantially normal to the annular seal face; and
moving the first seal structure toward the second seal structure to deform the seal member therebetween and into the gland structure to connect the first channel to the second channel.

18. The method of claim 17 wherein moving the first seal structure toward the second seal structure comprises:
rotating the first coupling portion relative to the second coupling portion to further engage the first coupling portion with the second coupling portion.

19. The method of claim 17 wherein:
deforming the seal member includes deforming the seal member away from the longitudinal axis.

20. The method of claim 17 wherein the annular seal face defines a channel opening through which the second channel extends, and the deformation of the seal member into the gland structure further comprises:
deforming the seal member away from the channel opening.

* * * * *